Feb. 13, 1968

G. B. BUSH ETAL 3,369,234

POLARIZATION CONTROL APPARATUS

Filed Oct. 3, 1962

George B. Bush
Fletcher C. Paddison
INVENTORS

BY Claude Funkhouser
ATTORNEY

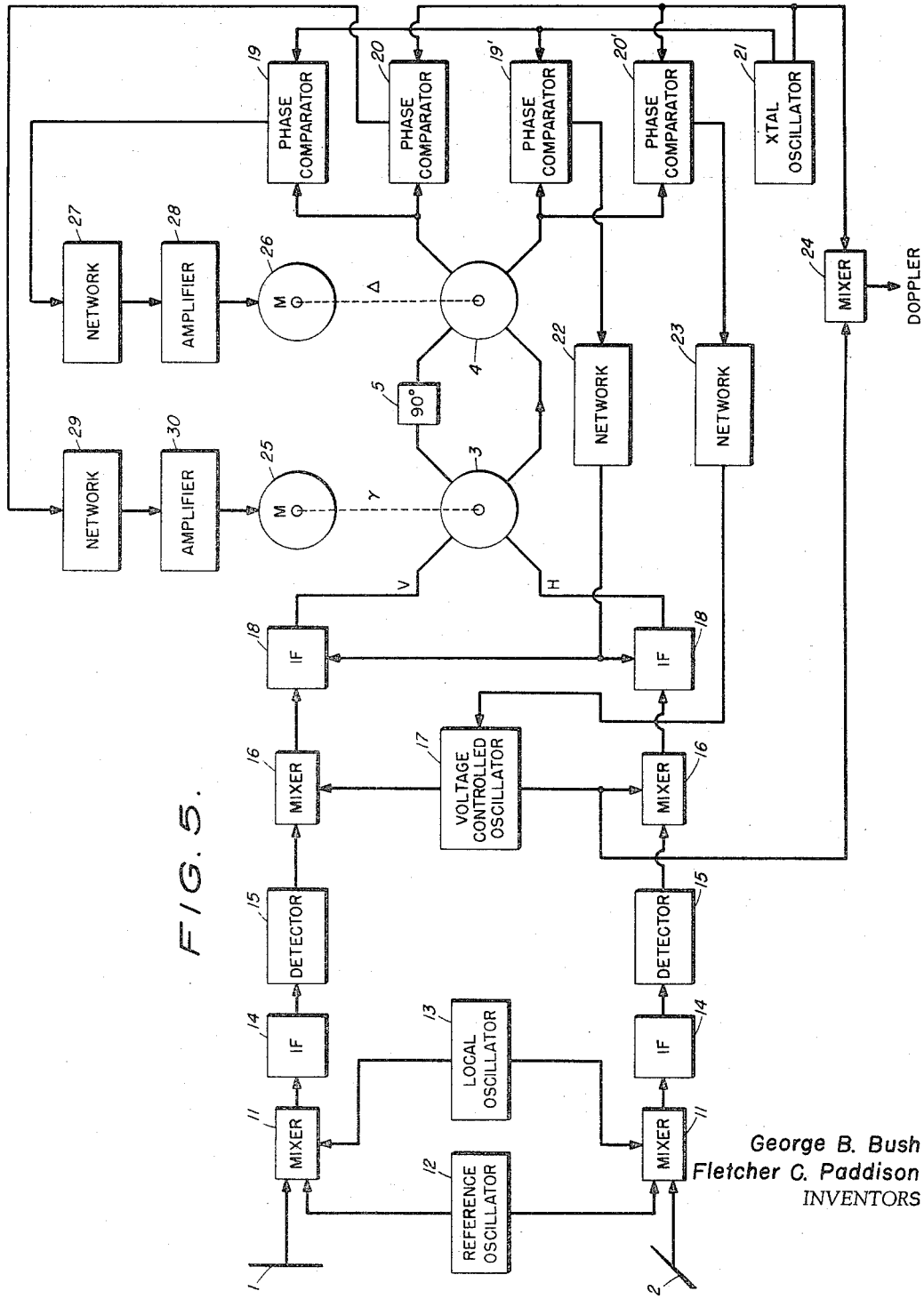

United States Patent Office 3,369,234
Patented Feb. 13, 1968

3,369,234
POLARIZATION CONTROL APPARATUS
George B. Bush, Clarksville, and Fletcher C. Paddison, Bethesda, Md., assignors to the United States of America as represented by the Secretary of the Navy
Filed Oct. 3, 1962, Ser. No. 228,209
7 Claims. (Cl. 343—100)

The present invention relates in general to polarization control systems and more particularly to a system for receiving elliptically polarized electromagnetic waves, which system contains means for automatically and continuously adjusting the reception polarization of the system.

The effect that electrons in the atmosphere have on radio waves is influenced by the fact that these electrons are in the presence of the earth's magnetic field, which exerts a deflecting force on the moving electron. The magnitude of this deflecting force is proportional to the instantaneous velocity of the electron and is in a direction at right angles to the lines of magnetic flux. At very high radio frequencies, where the maximum velocity attained by an electron in the path of a wave is small, the deflecting forces that are exerted by the earth's magnetic field are correspondingly slight with the result that the path followed by the vibrating electron is a narrow ellipse. The ratio of minor to major axes of the ellipse depends upon the orientation of the electrostatic flux lines of the radio wave with respect to the earth's magnetic field. The motion along the minor axis causes some of the energy reradiated by the vibrating electron to have a component polarized at 90° with respect to the polarization of the passing wave. Hence a radio wave in passing through an ionized region in the upper atmosphere has its plane of polarization affected by the earth's magnetic field.

A quantitative analysis shows that the presence of a magnetic field, in addition to affecting the polarization of a wave passing through it, also causes the wave to be split into two components which follow different paths, have different phase velocities, and suffer different attenuations. As a consequence a wave that has passed through an ionized region will have both vertically and horizontally polarized components irrespective of the polarization of the waves radiated from the transmitter, and furthermore the vertical and horizontal polarizations will, in general, not be in the same phase, resulting in the return of a wave which is elliptically polarized.

In the reception of elliptically polarized waves it is obvious that for maximum signal the receiving antenna should have a polarization characteristic which corresponds to that of a signal wave front. In prior art systems for the reception of airplane, missile, or space vehicle signals a circularly polarized or linearly polarized receiving antenna was used. As a result of the elliptical polarization introduced by the earth's magnetic field the mismatch between the polarization characteristic of the antenna and that of the signal wave front resulted in a loss of from 3 db to complete null due to cross polarization.

It is, therefore, an object of the present invention to provide a system for automatically and continuously adjusting the reception polarization of a signal receiving system to match the polarization of the received signal wave front.

It is another object of the present invention to provide a closed loop servo system for continuously adjusting the reception polarization of a signal receiving system by performing a vector manipulation on the received signal components while preserving their amplitude and phase relationship.

It is still another object of the present invention to provide a system for receiving vertical and horizontal components of a polarized signal which performs a continuous vector manipulation of said components so that the output of the system has a signal maximum corresponding to an equivalent adjustment of the antenna structure to a correspondence in polarization.

Other objects and many of the attendant advantages of this invention will be readily appreciated as the same becomes better understood by reference to the following detailed description when considered in connection with the accompanying drawings, wherein:

FIG. 5 is a schematic circuit diagram of one embodiment of the invention.

Figure 1:
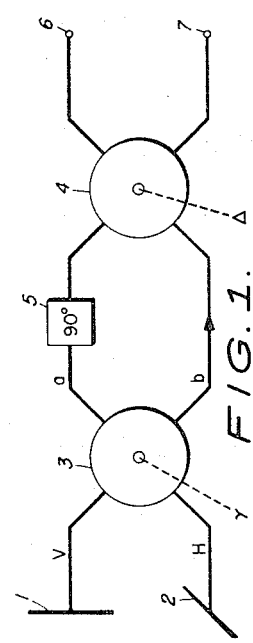
FIG. 1 is a schematic diagram illustrating the basic teachings of the invention.

The reception process to be described in conjunction with the invention is based upon the reception of component signals from a vertical dipole 1 and a horizontal dipole 2 and the vector manipulation to be performed on these component signals is performed by a pair of resolvers 3 and 4, all shown in FIG. 1. The input to resolver 3 is derived from antennas 1 and 2 and consists of the horizontal and vertical components of the incoming polarized wave.

Figure 3:
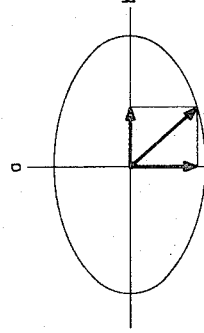
FIGS. 2 and 3 represent vector diagrams illustrating the operation of the circuit of FIG. 1.
Figure 2:
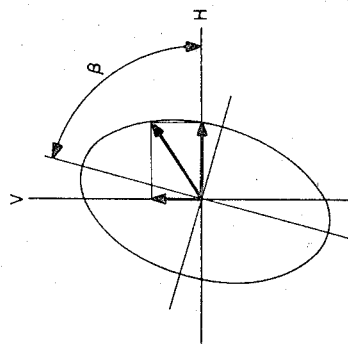

With general elliptical polarization, the vector description of this pair of signals may be as shown in FIG. 2. Since the relative phase and magnitudes of the signal components are complicated functions of the state of polarization, the first resolver 3 is used to align the axes of elliptical polarization with the horizontal and vertical axes of antennas 1 and 2. If the shaft position $\gamma$ is made equal to the inclination $\beta$ of the major axis of the polarization ellipse, then the output of resolver 3 will be the same as if the dipoles 1 and 2 were rotated by this angle, producing a vector description as shown in FIG. 3.

The vector components $a$ and $b$ in the output of resolver 3 now have the property that they are always exactly at 90° time phase with respect to each other. According to the invention the vector components $a$ and $b$ are now combined to produce a maximum resultant output. This vector manipulation requires that these vectors be shifted to have the same time phase. This is accomplished by a 90° phase shifter 5 in the line containing component $a$. The phase equivalent signals are then introduced as inputs to second resolver 4. Due to the fact that the magnitudes of the two component signals to resolver 4 will usually be different, the resulting magnetic field in resolver 4 will have an orientation depending upon the algebraic magnitude ratio of the phase equivalent input signals. If the shaft position $\Delta$ of this resolver 4 is set to a position corresponding to the orientation of the magnetic field, then one rotor output 6 will be maximum and the other rotor output 7 will be zero.

Figure 4:
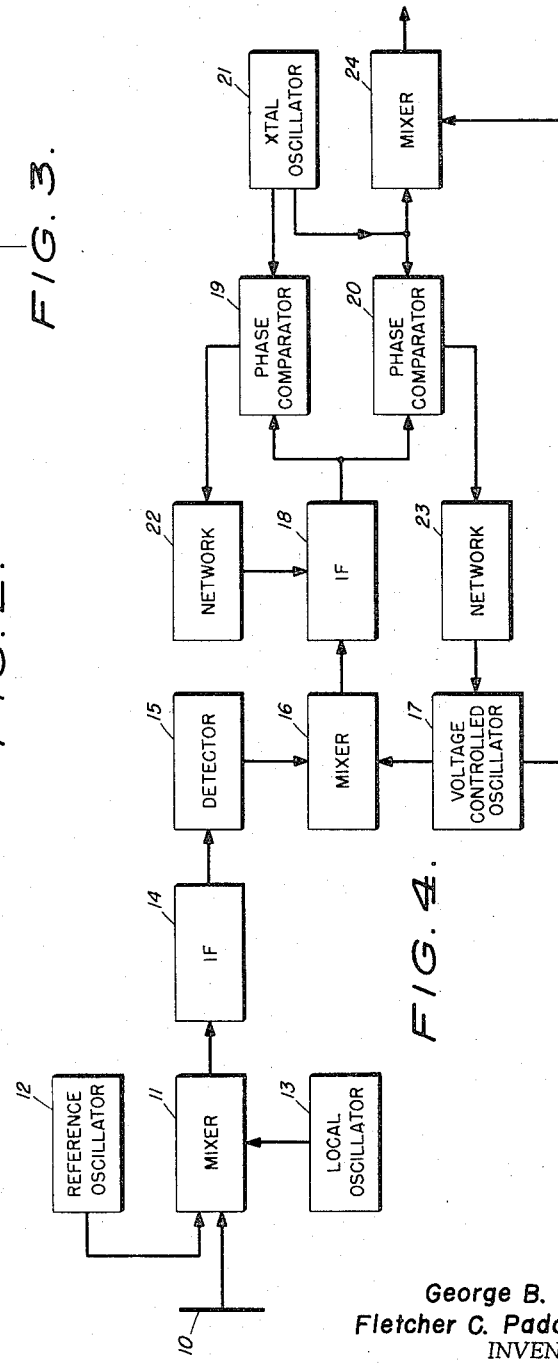
FIG. 4 is a schematic circuit diagram of one embodiment of a receiver into which the invention may be incorporated.

FIG. 4 illustrates a phase locked Doppler receiver into which the invention may be incorporated. The receiver consists of an antenna 10, for detecting electromagnetic energy, connected to a mixer 11 into which a reference signal injected by an oscillator 12 provides the stable reference against which the Doppler is generated. Mixer 11 also combines the Doppler signal with an IF signal from a local oscillator 13 which signal is then amplified in an IF amplifier 14 and recovered in a detector 15.

The output of detector 15 is applied to a mixer 16 where it is combined with the output of a voltage controlled oscillator 17. The output of mixer 16 is amplified in IF amplifier 18 and then applied to a pair of phase comparators 19 and 20 where it is compared with the output of crystal controlled oscillator 21. Comparator 19 is, in turn, connected through network 22 back to IF amplifier 18 and comparator 20 is connected through network 23 to voltage controlled oscillator 17. The two phase comparators 19 and 20 provide through their respective networks null-seeking control of signal amplitude and phase, respectively, at a selected bandwidth. Therefore, if the output phase of amplifier 18 differs from the phase of oscillator 21, this condition will be detected by comparator 20 and will be corrected by application of a control voltage to oscillator 17 by network 23. In a like manner, if the amplitude of the output of amplifier 18 differs from a preset value, this condition will be detected in comparator 19 and corrected by application of a control voltage to amplifier 18 by network 22. The system thus provides both amplitude control and phase locking. The Doppler signal is derived in mixer 24 by comparing the output of voltage controlled oscillator 17 with the output of crystal oscillator 21.

FIG. 5 shows the receiver of FIG. 4 arranged to receive both horizontal and vertical components of an incoming signal wave. To this receiver has been added a polarization adjusting system constructed according to the principles of the invention. Similar components between FIGS. 1 and 4 and FIG. 5 have been given similar designations. The horizontal receiver section consists of dipole 2, mixer 11, IF amplifier 14, detector 15, mixer 16 and IF amplifier 18. The vertical receiver section is identical to the horizontal section and both sections are fed from a common reference oscillator 12, local oscillator 13, and voltage controlled oscillator 17. The sections operate in the manner described in connection with the system of FIG. 4.

The outputs of the two amplifiers 18 are applied to the input terminals of resolver 3. The shaft position $\gamma$ of resolver 3 is controlled by servo motor 25 so as to effect a rotation of the major axis of the polarization ellipse. One of the outputs of resolver 3 is applied to a 90° phase shifter so as to bring it into phase coincidence with the other output of the resolver. The two phase coincident signals are then applied to second resolver 4 wherein the vector sum of these signals is derived. The shafts position $\Delta$ of resolver 4 is controlled by servo motor 26 so that the resolver rotor aligns itself with the internal magnetic field of the resolver. One output of resolver 4 is applied to a pair of phase comparators 19 and 20 and the other output is applied to a second pair of phase comparators 19' and 20'. To each of the phase comparators is applied a constant voltage from crystal oscillator 21.

If the shaft positions $\gamma$ and $\Delta$ of resolvers 3 and 4, respectively, are set to the proper value, the input to comparators 19 and 20 will be zero and the input to comparators 19' and 20' will be equal to the vector sum of the horizontal and vertical received component signals. The zero output from resolver 4 is, therefore, used to effect null control of the motors 25 and 26 and thereby maintain the shafts of resolvers 3 and 4 at their respective proper positions $\gamma$ and $\Delta$. This is accomplished by feeding the output of comparator 19 through network 27 and amplifier 28 to motor 26 and the output of comparator 20 through network 29 and amplifier 30 to motor 25 thereby effecting rotation of servo motors 25 and 26 whenever the output to comparators 19 and 20 is other than zero. Comparator 19' is connected through network 22 to the IF amplifiers 18 and effects amplitude control thereof. Comparator 20' is connected through network 23 to voltage controlled oscillator 17 and effects phase control thereof. The output from crystal oscillator 21 and the output from oscillator 17 are combined in mixer 24 to produce the useful Doppler signal.

Thus the invention provides a system for effecting automatic and continuous adjustment of the reception polarization of a receiver. Further, the bandwidth properties of this adjustment process are comparable to those used in the phase-lock detection of weak signals. The polarization tracking loops are intimately related to the phase-lock loops. This preserves the requirement that the processing of polarization information should have the property that only signals which have a correlation in the same bandwidth as that used in phase-lock reception should be effective in designating the polarization parameters.

The receiving system which has been described in conjunction with the invention has been selected arbitrarily to provide a proper background for the description of the invention. Any suitable receiver may be substituted therefor.

In particular a change to a fully coherent receiver may be desired. This can be accomplshed by deletion of the reference oscillator 12 and the detector 15. When the frequency of crystal oscillator 21 would be equal to the difference frequency between voltage controlled oscillator 17 and IF amplifier 14.

Obviously many modifications and variations of the present invention are possible in the light of the above teachings. It is, therefore, to be understood that within the scope of the appended claims, the invention may be practiced otherwise than as specifically described.

What is claimed is:
1. A polarization tracking system comprising
   a pair of mutually perpendicular antennas for receiving horizontal and vertical vector components of a polarized electromagnetic wave,
   first resolving means for manipulating said vector components to correspond to an equivalent rotation of the plane of polarization of said received wave to coincide with the coordinates of said pair of antennas,
   phase shifting means connected to said resolving means for bringing said wave components into phase coincidence, and
   second resolving means for effecting a vector summation of said phase coincident components such that said vector summation has a signal maximum corresponding to an equivalent adjustment of the antenna structure to a correspondence in polarization.
2. A polarization tracking system comprising
   a pair of mutually perpendicular antennas for receiving horizontal and vertical vector components of an elliptically polarized electromagnetic wave,
   a first resolver connected to said pair of antennas,
   means for positioning the shaft of said resolver so as to manipulate said vector components to correspond to an equivalent rotation of the plane of polarization of said received wave to coincde with the coordinates of said pair of antennas,
   phase shifting means connected to said first resolver for bringing said wave components into phase coincidence,
   a second resolver connected to said phase shifting means and said first resolver for effecting a vector summation of said phase coincident components,
   means connected to said second resolver for positioning the shaft of said resolver according to the magnitude ratio of said wave components, and
   control means connected to the output of said second resolver for controlling the shaft positioning means associated with said first and second resolvers so that continuous adjustment of the polarization characteristic of said system is effected.
3. A polarization tracking system as defined in claim 2, wherein
   said shaft positioning means comprises a pair of servo motors each associated with one of said resolvers, and said control means comprises a pair of servo networks each connected to one of said servo motors for effecting control thereof.

4. A polarization tracking system comprising
a receiver containing a pair of mutually perpendicular antennas for receiving horizontal and vertical vector components of an elliptically polarized electromagnetic wave,
a first resolver having a pair of inputs and a pair of outputs, each of the inputs to said first resolver being connected to one of said antennas through said receiver,
a first servo motor connected to the shaft of said first resolver for positioning said shaft so as to manipulate said vector components to correspond to an equivalent rotation of the plane of polarization of said received wave to coincide with the coordinates of said pair of antennas,
a phase shifter connected to one output of said first resolver for bringing said wave components into phase coincidence,
a second resolver having a pair of inputs connected to said phase shifter and the other output of said first resolver and a pair of outputs,
a second servo motor connected to the shaft of said second resolver for positioning said shaft according to the magnitude ratio of said wave components, and
a pair of servo control networks connected to one of the outputs of said second resolver and each connected to one of said servo motors so that continuous adjustment of the polarization charatceristic of said system is effected.

5. A polarization adjusting system comprising, a receiver having a pair of mutually perpendicular antennas for receiving the vector components of a polarized wave,
a resolver connected to said antenna pair, said resolver aligning said vector components with said antennas, and
summing means connected to said resolver for shifting into vector coincidence and combining said vector components.

6. The polarization adjusting system of claim 5 in which said summing means includes a 90° phase shifting circuit for shifting said vector components into phase coincidence.

7. The polarization adjusting system of claim 6 in which said summing means further includes a second resolver, said second resolver receiving said phase coincident components and providing an output signal which is proportional to the magnitudes of said received components.

References Cited

UNITED STATES PATENTS 1,915,784   6/1933   Hammond.
2,857,575  10/1958   Zaleski _____ 333—17

RODNEY D. BENNETT, *Primary Examiner.*

CHESTER L. JUSTUS, KATHLEEN CLAFFY,
*Examiners.*

R. E. BERGER, *Assistant Examiner.*